(12) United States Patent
Page

(10) Patent No.: US 6,409,256 B1
(45) Date of Patent: Jun. 25, 2002

(54) MULTI-PIECE APPLIQUE FOR VEHICLE B-PILLAR

(75) Inventor: Michael Page, Casco, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/766,671

(22) Filed: Jan. 23, 2001

(51) Int. Cl.$^7$ .................................................. B60J 7/00
(52) U.S. Cl. ............................ 296/203.03; 296/203.02; 296/203.01; 49/479.1; 49/475.1
(58) Field of Search ......................... 296/203.03, 152, 296/146.9; 428/31; 49/479.1, 475.1, 489.1, 502; 52/716.5, 718.01, 718.3

(56) References Cited

U.S. PATENT DOCUMENTS

| 4,736,981 A | | 4/1988 | Barton et al. | |
|---|---|---|---|---|
| 5,092,078 A | | 3/1992 | Keys | |
| 5,353,571 A | * | 10/1994 | Berdan et al. | 52/716.5 |
| 5,702,148 A | | 12/1997 | Vaughan et al. | |
| 5,773,115 A | * | 6/1998 | Ash | 428/31 |
| 5,833,303 A | * | 11/1998 | Kawai et al. | 296/189 |
| 5,988,733 A | * | 11/1999 | Kamo et al. | 296/203.01 |
| 5,992,876 A | * | 11/1999 | Gray | 280/728.3 |
| 6,095,593 A | * | 8/2000 | Johann et al. | 296/189 |
| 6,103,168 A | * | 8/2000 | Kelly | 156/245 |
| 6,142,506 A | * | 11/2000 | Patel et al. | 296/189 |
| 6,267,436 B1 | * | 7/2001 | Takahara | 296/203.02 |
| 6,322,135 B1 | * | 11/2001 | Okana et al. | 296/203.02 |
| 6,340,200 B1 | * | 1/2002 | Enomoto et al. | 296/203.02 |
| 2001/0024052 A1 | * | 9/2001 | Takahara | 296/203.03 |

FOREIGN PATENT DOCUMENTS

JP          4110226      *  4/1992

* cited by examiner

Primary Examiner—Ken Patel
(74) Attorney, Agent, or Firm—Nixon & Vanderhye P.C.

(57) ABSTRACT

A multi-piece applique for a pillar (e.g., B-pillar) or other suitable structure of a vehicle. An applique is a decorative member which is fastened to a vehicle surface (e.g., to a door frame structure adjacent a pillar) in order to add styling and/or to functionally cover unsightly portions of the vehicle. In certain embodiments of this invention, the applique includes multiple pieces. Optionally, different pieces may be painted different colors (e.g., a first piece red or green, and a second piece black or silver). In such a manner, a multi-color applique is provided that is easy to mount on a vehicle and is aesthetically pleasing.

14 Claims, 7 Drawing Sheets

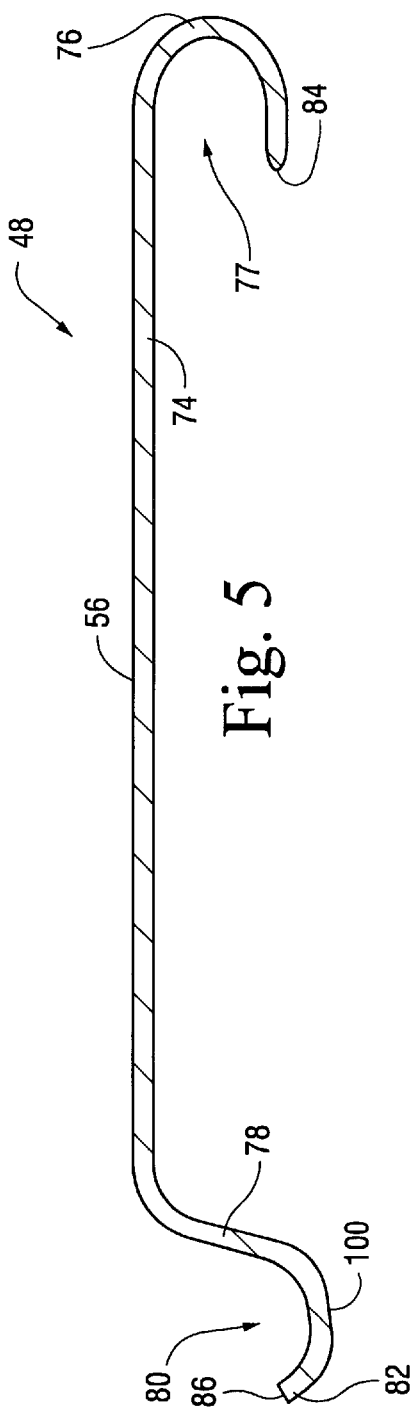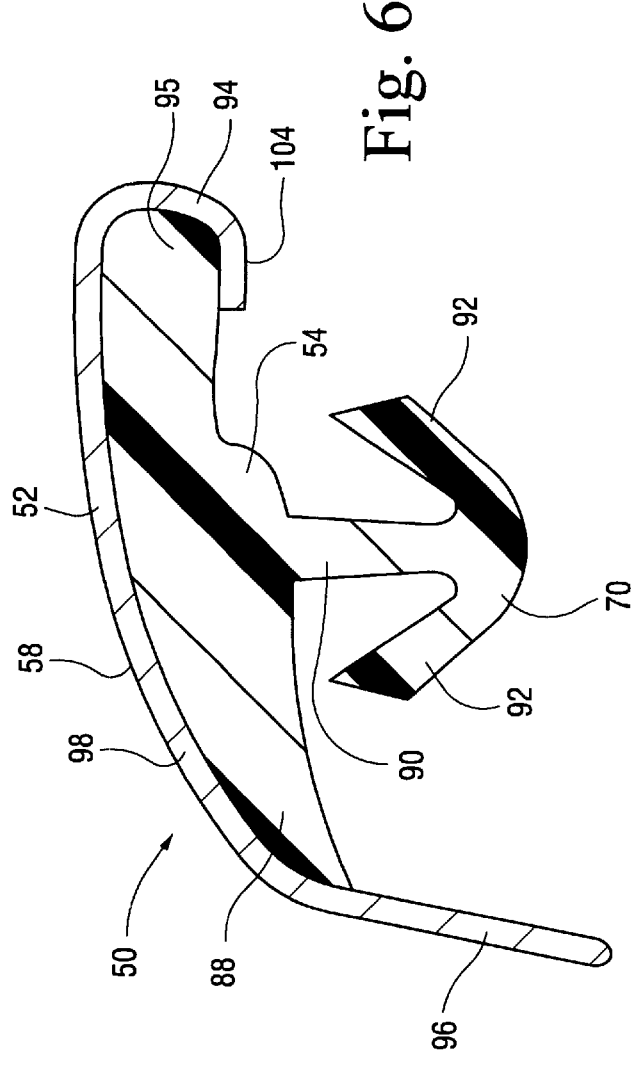

MULTI-PIECE APPLIQUE FOR VEHICLE B-PILLAR

This invention relates to a multi-piece (e.g., two-piece) applique for a vehicle pillar or other suitable vehicle surface.

BACKGROUND OF THE INVENTION

An applique is a decorative member or cover which is fastened to a vehicle surface to add styling and/or to functionally cover aesthetically non-pleasing portions of the vehicle. Conventional appliques are made of metal and/or plastic as is known in the art. For example, it is known to provide appliques over the external surfaces of B-pillars of a vehicle (car, truck, van, or the like). While the applique may be attached directly to the B-pillar itself, it is also possible to attach a B-pillar applique to door sheet metal so that the applique is not directly attached to the pillar and instead opens and closes along with the door (front or rear door) while the B-pillar remains fixed in place. A pillar is known in the art as a structural member provided to support the structure of a vehicle.

FIG. 1 illustrates a conventional automobile. The automobile of FIG. 1 includes front and rear assemblies 1 and 3 having front and rear windows 5 and 7, respectively. The vehicle B-pillar, generally designated by reference numeral 9, is located at least partially between the front and rear windows. Generally speaking, forward pillar 11 is typically referred to as an A-pillar, center pillar 9 as a B-pillar, and rear pillar 13 as a C-pillar.

Because of the high visibility of the B-pillar area, appliques are commonly used to provide an aesthetically pleasing surface on or proximate the pillar. Such an applique is used, for example, to cover manufacturing imperfections or the like and is commonly finished in cooperating or matching vehicle colors to provide a desirable aesthetic appearance.

FIGS. 2 and 3(a)–3(b) illustrate a conventional applique for a vehicle B-pillar that has been sold by the applicant. This single color (e.g., black) B-pillar applique is attached to the door frame (not directly to the B-pillar) so that the applique opens and shuts along with the door (e.g., front door) while the B-pillar remains fixed in place. It is currently believed that this applique represents "prior art" and therefor it is labeled as such. As can be seen, the applique of FIGS. 2–3 includes both an overlying formed sheet metal portion 30 which is to be seen by a viewer, and an underlying polymeric portion 31 attached to portion 30. Sheet metal portion 30 includes flange 34 as well as aesthetically pleasing curved portion 35. Plastic fasteners 32 are provided in order to help secure the applique to the B-pillar.

The exterior surface 33 (see FIG. 2) of this B-pillar applique is typically seen by a viewer looking at the exterior of a vehicle on which the applique is mounted. The interior surface 36 (see FIG. 3) of the applique is typically hidden from view when the applique is mounted on the vehicle. Thus, it is customary in the art to paint the exterior surface 33 of an applique (e.g., with black paint) so as to render the vehicle aesthetically pleasing to those looking at it. Exterior surfaces of conventional appliques are typically painted a single color (e.g., black) by a manufacturer of the applique.

Unfortunately, there is no easy and cost-effective way to provide a multi-colored applique other than trying to use different paint processes with different colors in painting a single piece applique. This may be undesirable in certain circumstances.

Thus, it will be apparent to those skilled in the art that there exists a need in the art for an applique structure which enables an applique manufacturer to efficiently enable a multi-colored applique to be formed if this is desirable. It is a purpose of different embodiments of this invention to fulfill any and/or all of the aforesaid described needs in the art, and/or to solve any or all of the aforesaid problems or other problems which will become apparent to the skilled artisan when given the following disclosure.

SUMMARY OF THE INVENTION

An object of this invention is to provide an improved multi-piece applique for at least partially covering a pillar (e.g., B-pillar) or other surface (e.g., door frame) of a vehicle (e.g., car, truck, van, etc.).

Another object of this invention is to provide an improved multi-piece applique for a vehicle. In certain embodiments of this invention, a first piece or component of the applique may be painted a first color (e.g., red) while a second piece or component of the applique may be painted a second color (e.g., black) so that when the applique is assembled the result is a multi-colored applique. In other embodiments, both pieces of the applique may be painted the same color (e.g., black).

Another object of this invention is to provide a multi-piece applique that is easy to attach to or mount on a surface (e.g., door frame structure or pillar) of a vehicle in separate steps.

Another object of this invention is to provide a multi-piece applique for a vehicle, wherein a first piece of the applique helps to hold in place a second piece of the applique.

Another object of this invention is to provide a B-pillar applique which includes a molded polymer inclusive (e.g., entirely or partially of a polymer material) retainer member adhered or otherwise fastened thereto, the retainer member including at least one fastener for helping retain the applique on the door of a vehicle.

In certain embodiments of this invention, the B-pillar remains fixed in place while the B-pillar applique is attached to a door (front or rear door) for opening and closing therewith. In other words, the B-pillar applique may not be directly connected to the B-pillar itself, but instead may be attached/connected to the door frame. While not preferred, it is also possible to attach the multi-piece applique directly to the pillar itself.

Yet another object of this invention is to satisfy one or more of the aforesaid objects and/or needs.

This invention will now be described with respect to certain embodiments thereof, along with reference to the accompanying illustrations.

BRIEF DESCRIPTION OF THE DRAWINGS

FIG. 5 is a sectional view of the first piece of the pillar applique of FIG. 4.

FIG. 6 is a sectional view of the second piece of the pillar applique of FIG. 4.

DETAIL DESCRIPTION OF CERTAIN EMBODIMENT OF THIS INVENTION

Figure 1:
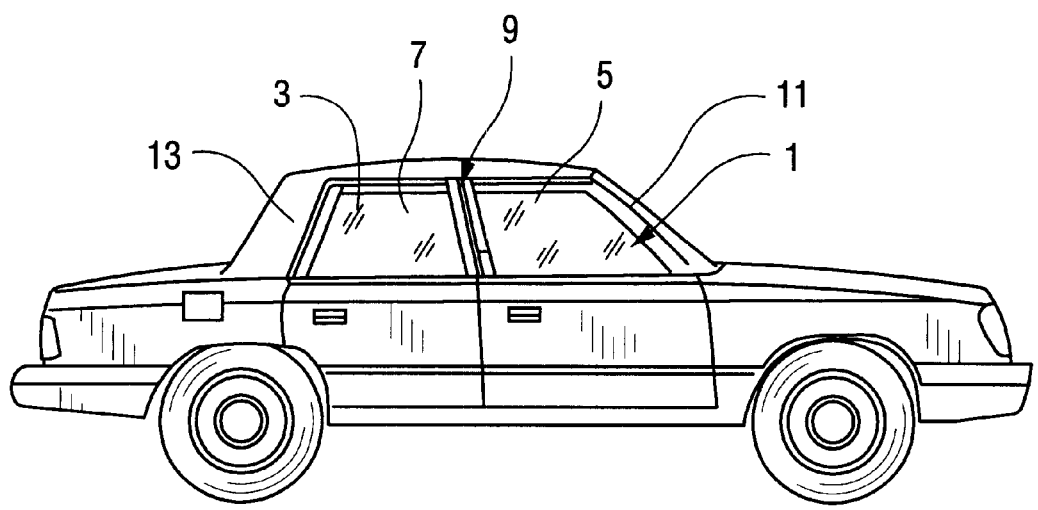
FIG. 1 is a side plan view of a conventional automobile.
Figure 2:
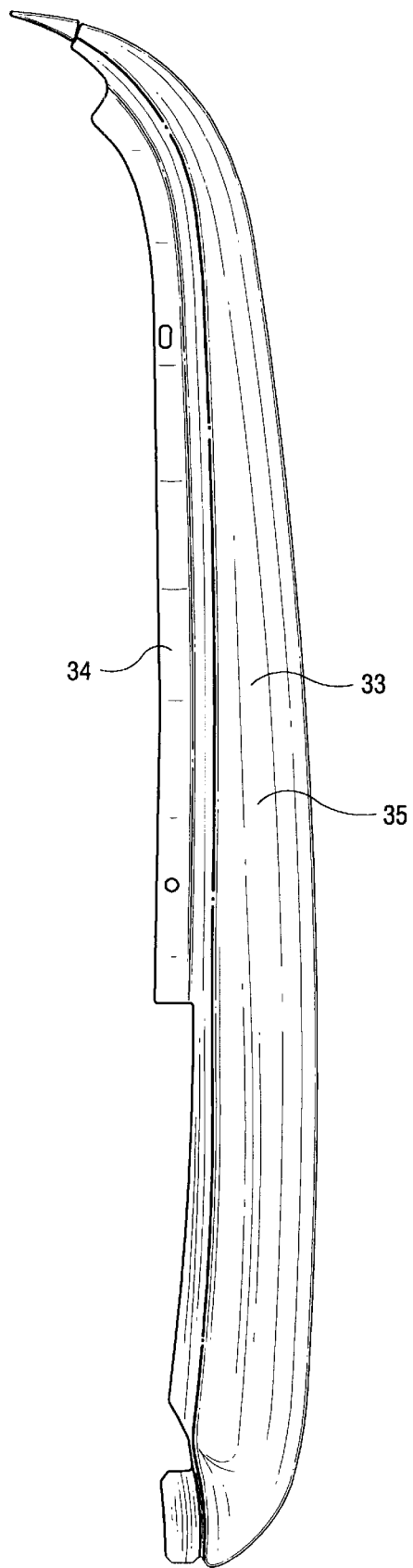
FIG. 2 is a side plan view of a conventional applique for a vehicle B-pillar which illustrates the exterior surface of the applique (i.e., the side seen by one viewing the vehicle to which the applique is attached).
Figure 3A:
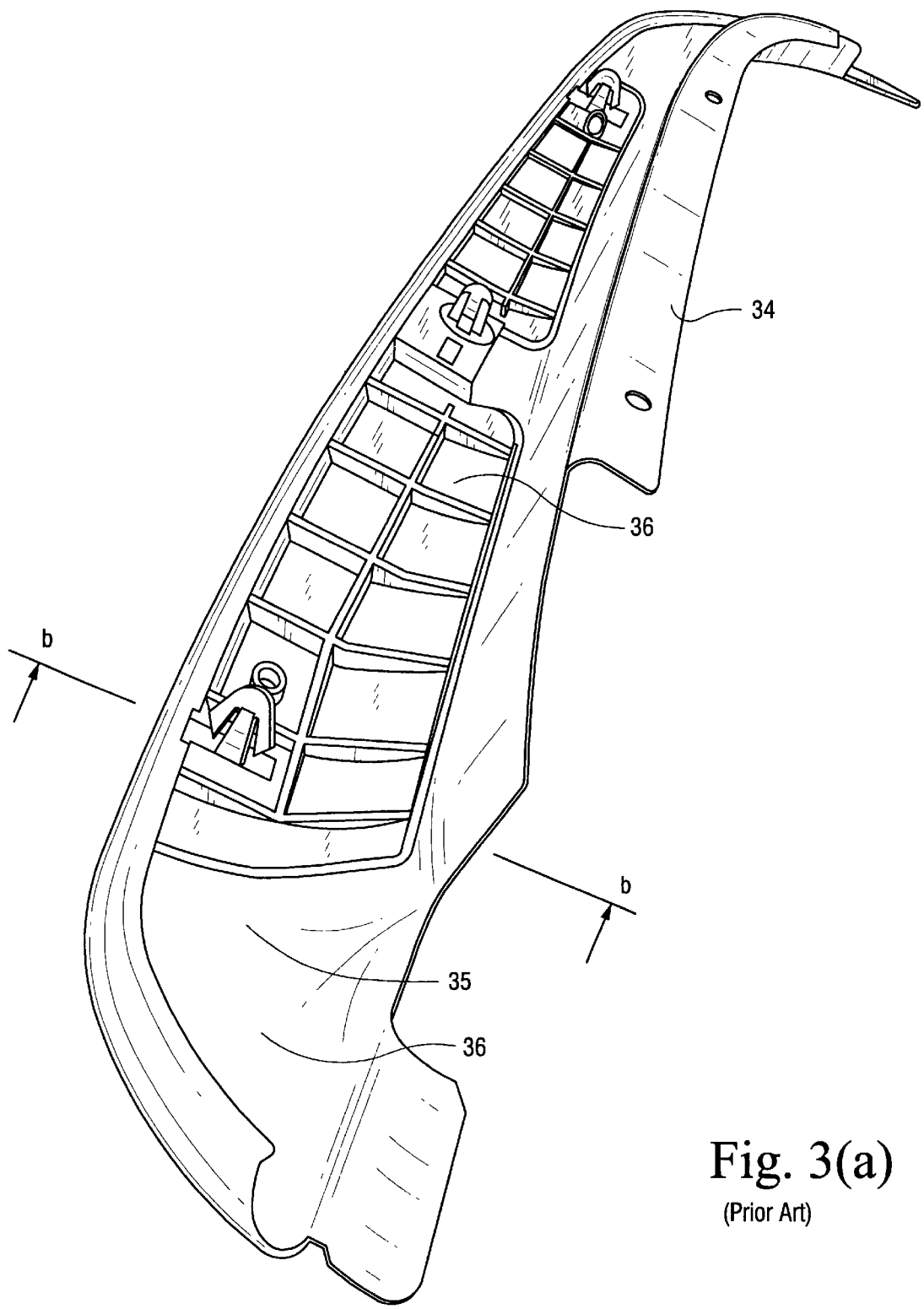
FIG. 3(a) is a perspective view illustrating the underneath side of the applique of FIG. 2.
Figure 3B:
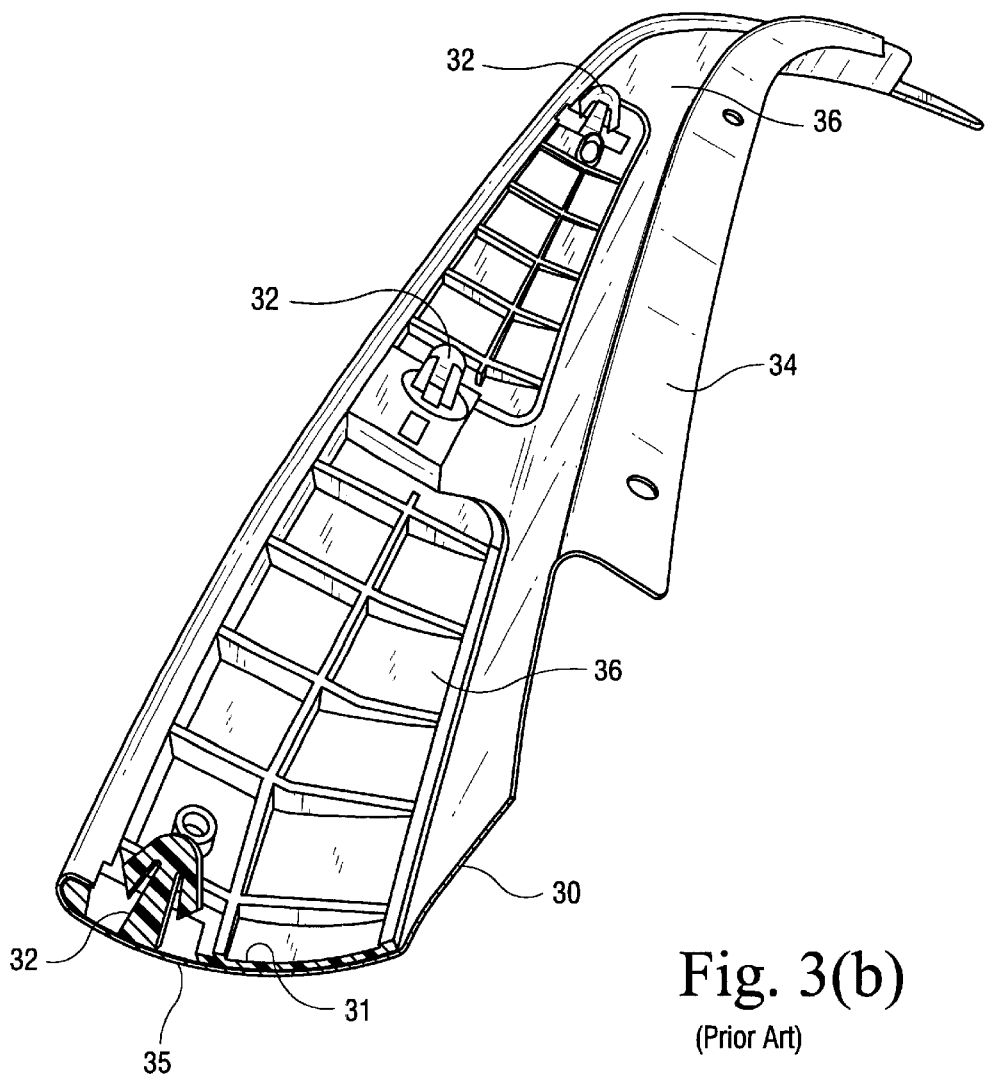
FIG. 3(b) is a partial cross sectional view illustrating the applique of FIGS. 2–3(a) along section line b—b, illustrating a cross section of a plastic or polymeric fastener of the applique.

Referring now more particularly to the accompanying drawings in which like reference numerals indicate like parts throughout the several views.

Figure 4:
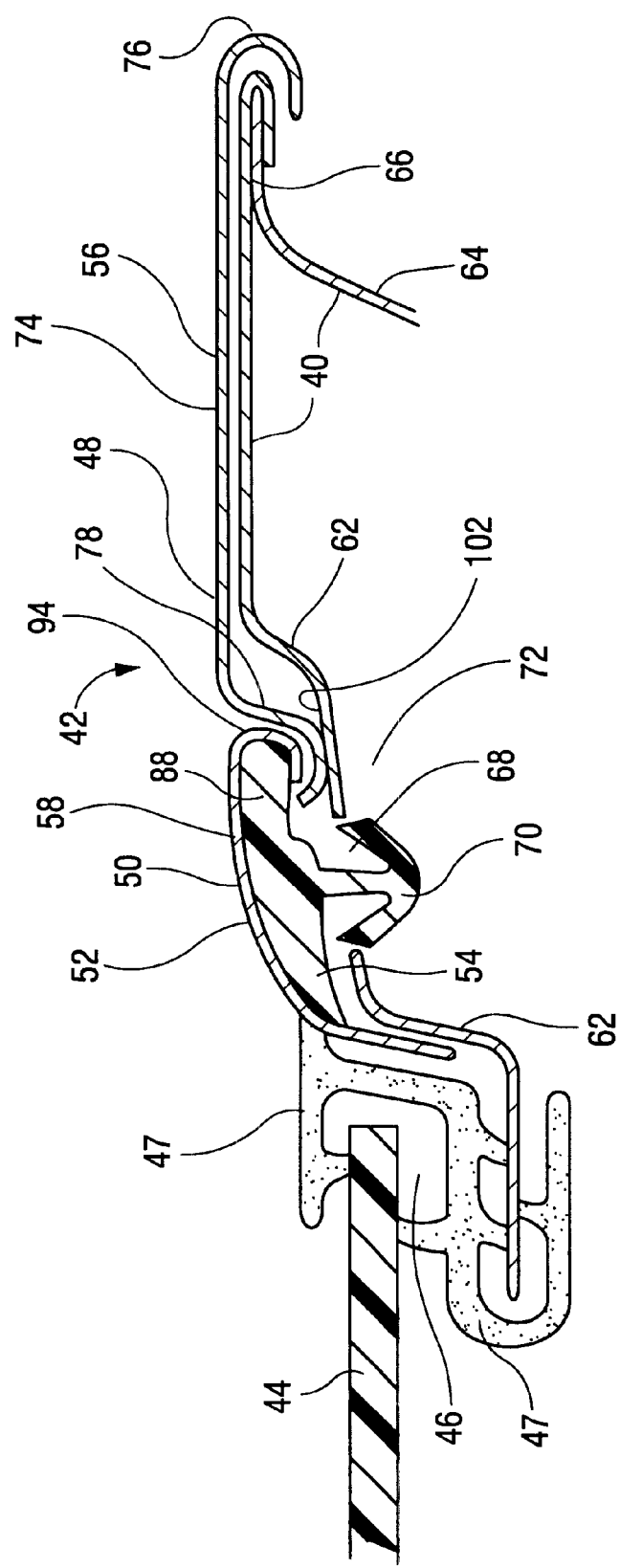
FIG. 4 is a sectional view of a portion of a B-pillar applique assembly according to an embodiment of this invention (i.e., viewed sectionally from the top in the case of a front door on the passenger side of the vehicle).

FIG. 4 is a sectional view of a B-pillar assembly according to an embodiment of this invention. The assembly includes door frame structure 40, multi-piece applique 42 which is fastened/attached to sheet metal of the door frame 40, and glass vehicle door window 44 which is received within glass window channel 46 formed via window seal 47. Applique 42 is attached to the exterior or outboard side of door frame 40. The applique 42 includes first and second separately made pieces; namely first applique piece or component 48 and second applique piece or component 50. Pieces 48 and 50 are preferably made at least partially of formed sheet metal (e.g., aluminum) in certain embodiments, although other materials may instead be used. FIGS. 5 and 6 are enlarged sectional views of applique pieces 48 and 50, respectively. As can be seen, first piece 48 may be of a single formed piece of sheet metal while second piece 50 may include both formed sheet metal member 52 and polymer inclusive retainer member 54 which is attached to an underneath surface of sheet metal member 52.

In certain embodiments of this invention, the exterior surface 56 of first piece/component 48 may be painted a first color (e.g., red) while the exterior surface 58 of the second piece/component 50 may be painted another color (e.g., black). In such a manner, a structure is provided which lends itself to easily providing a multi-colored applique for attachment to a vehicle. For example, it may be desired to provide a black color on piece 50 near the corner of a window and a red (e.g., body matching or complimentary color) color on piece 48 for matching or more closely complimenting the body color of the vehicle. In such an example, during the manufacturing process of pieces 48 and 50, exterior surface 56 of piece 48 could be painted red and exterior surface 58 of piece 50 could be painted black. As shown in the drawings and as will be more fully explained below, when the multi-piece (e.g., two-piece) applique is attached to the vehicle (e.g., to a red colored vehicle) it has a visual appearance similar to a multi-colored applique when viewed from a distance and is thus thought by some to be aesthetically pleasing. Different colored painting steps on a single applique piece are thus not needed in certain embodiments of this invention. However, it will be appreciated by those skilled in the art that both pieces 48 and 50 of applique 42 may be painted the same color in alternative embodiments of this invention when so desired.

Figure 7:
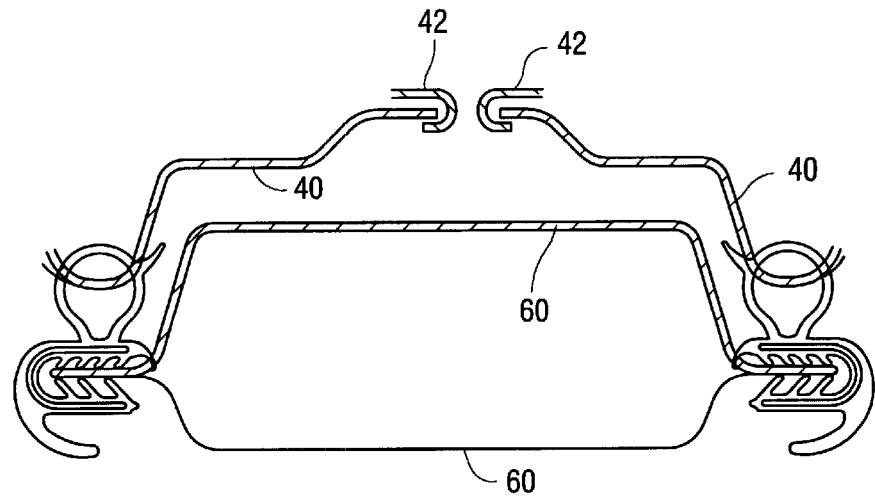
FIG. 7 is a sectional view illustrating a portion of a B-pillar assembly according to an embodiment of this invention wherein a portion of the applique is shown attached to a door frame structure which in turn is attached to the B-pillar itself so that the applique(s) can open/close along with a respective door while the B-pillar remains fixed in place.

The term pillar herein refers to any structural member of a vehicle, including but limited to A-pillars, B-pillars, C-pillars, or any other types of vehicle pillars. Pillars are typically fixed to a vehicle and do not open or shut along with a door (e.g., see FIG. 7). Meanwhile, B-pillar appliques herein are preferably attached to corresponding door frames (for front or rear doors) 40 so as to open and/or close therewith relative to the fixed B-pillar. In this regard, FIG. 7 is a partial sectional view illustrating a part of appliques 42 attached to respective front and rear door frame structures. Door frame structures 40 are in turn attached to B-pillar 60. According to this particular embodiment partially illustrated in FIG. 7, appliques 42 open/shut along with door frame structures 40 while B-pillar 60 remains fixed.

Referring again to FIG. 4, door frame structure 40 includes first and second metal sheets 62 and 64, respectively. Outboard door frame sheet 62 and inboard door frame sheet 64 are formed as illustrated in FIG. 4 so as to create door frame flange 66 where the two sheets are welded together. At least one (and preferably a plurality of) aperture or hole 68 is/are formed in outboard door frame sheet 62 in order to receive fastener or retainer member(s) 70 (e.g., W-based clip 70 as illustrated) therein, in order to help fasten and/or secure applique 42 to door frame structure 40. Cavity or hollow area 72 is provided between door frame sheets 62 and 64 in the area proximate apertures 68 in order to provide structural strength and to permit a portion of fastener(s) 70 to protrude through aperture(s) 68 in order to enable a secure fastening system for securing the applique 42 to the door frame structure 40. It is noted that appliques 42 herein may be attached to either front or rear door structures in different embodiments. Moreover, door frame structure 40 illustrated in FIG. 4 is merely exemplary; other types/shapes of door frame structure may instead be used in combination with appliques described herein.

Referring to FIGS. 4–5, first applique piece 48 includes approximately flat or planar portion 74. At a first end of piece 48, approximately hook-shaped retainer portion/member 76 defines recess 77 and extends from one end of portion 74. Recess 77 is adapted to receive a portion of flange 66. The other end of piece 48 includes angled portion 78 that extends from the other end of portion 74. Adjacent portion 74, angled portion 78 forms an angle of from approximately 40 to 90 degrees with portion 74, more preferably from about 60 to 80 degrees as shown in FIG. 4. The exterior surface 56 of angled portion 78 is shaped so as to form recess 80 defined by angled portion 78m which includes turned-up end portion 82. Recess 80 is adapted to receive and/or support a portion of second piece 50 as shown in FIG. 4 in order to simplify the mounting procedures associated with mounting the multi-piece applique 42 to door frame structure 40 or any other suitable structure (e.g., to a pillar itself). First piece 48 of applique 42 thus includes first and second ends 84, 86, with first end 84 also defining hook-shaped portion 76 and second end 86 helping to form recess 80. It is noted that recess 80 may be a shallow recess as shown in FIGS. 4–5, or instead may be a deep recess in alternative embodiments of this invention.

Referring to FIGS. 4 and 6, second piece 50 of applique 42 includes formed sheet metal member 52 and polymer inclusive retainer member 54. Retainer member 54 may be made of or include nylon or any other suitable polymer in different embodiments of this invention. Retainer member 54 may be adhered or otherwise attached to member 52 in any suitable manner in different embodiments of this invention. For example, as shown in FIGS. 4 and 6, approximately hook shaped portion 94 of metal member 52 wraps around at least a portion of body 88 of member 54 in order to help retain/attach polymer inclusive retainer member 54 to metal member 52. In other words, portion 95 of member 54 is received within a recess defined by hook-shaped portion 94 in order to help attach members 52 and 54 to one another.

In the embodiment of FIGS. 4 and 6, retainer member 54 includes body portion 88 with fastener 70 extending therefrom. Fastener 70 includes neck 90 and flexible tangs/tongs 92 extending therefrom. As shown in FIG. 4, at least a portion of neck 90 and tangs/tongs 92 extend through an aperture 68 defined in sheet 62 so as to help retain piece 50 on the door frame structure. Preferably, a plurality of spaced apart fasteners 70 (and corresponding apertures 68) are provided on piece 50 in this regard although only one is illustrated for purposes of simplicity. At least a portion of exterior surface 58 of metal member 52 is preferably painted, and adapted to be at least partially viewed by those looking at the vehicle to which the applique is attached. Metal member 52 further includes angled portion 96 that is adapted to both contact a portion of seal 47 and which helps define an overall recess in member 52 that receives member 54 therein. Angled portion 96, in certain embodiments, forms an angle of approximately 40 to 80 degrees with a more flat portion 98 of member 52.

Referring to FIGS. 4–7, two-piece applique 42 may be mounted to door frame structure in the following manner according to an exemplary embodiment of this invention. First, pillar (e.g., B-pillar) 60 is provided. Door frame structure 40, including formed metal sheets 62, 64, is attached directly or indirectly to pillar 60. First applique piece 48 is mounted by wrapping approximately hook shaped retainer portion 76 around an end of door frame flange 66 and allowing a bottom surface 100 of angled portion 78 to come to rest on an exterior surface 102 of outboard door frame sheet 62. Angled portion 78 need not be fastened or otherwise adhered to member 62 at this point during the assembly process as retainer portion 76 keeps it in place temporarily. Thus, a first end 76, 84 of first piece 48 is wrapped at least partially around flange 66 for retaining purposes. After first piece 48 has been mounted on the door frame structure in such a manner, second piece 50 is positioned so that (i) at least a portion of bottom surface 104 of retainer portion 94 comes to rest in recess 80 formed by first piece 48, and (ii) at least a portion of fastener(s) 70 extend(s) through corresponding aperture(s) 68 defined in door frame sheet 62, in order to attach second piece 50 to the door frame structure. When second piece 50 is attached to the door frame structure in such a manner, this also functions to hold down angled portion 78 of first piece 48 thereby securing both applique pieces 48, 50 to the door frame structure in order to complete the mounting of the applique on the vehicle.

Figure 8:
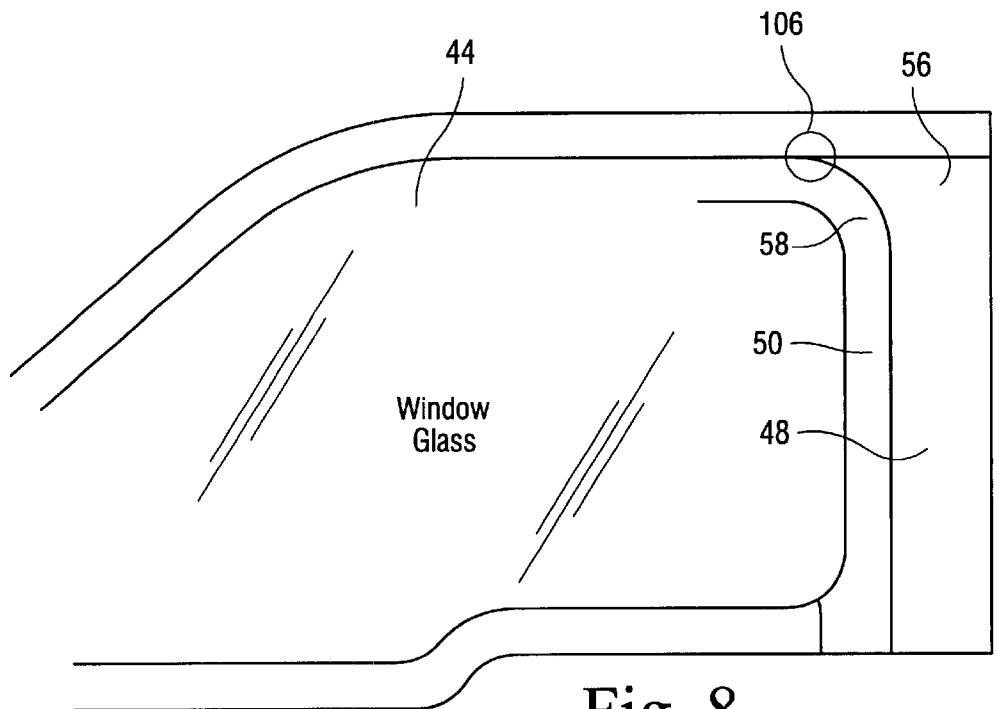
FIG. 8 is a side plan view illustrating a portion of the pillar applique of FIGS. 4–7 as viewed from the exterior of a driver's side door of a vehicle.

FIG. 8 is a side plan view of a portion of a driver's side vehicle door on which an applique 42 as described and illustrated above is mounted. As can be seen, the provision of two different pieces 48, 50 enables a multi-colored applique to be easily made and attached to the vehicle. For example, exterior surface 56 of first piece 48 may be painted red in order to match or otherwise compliment the color of the vehicle. However, exterior surface 58 of second piece 50 may be painted another color, such as black, in order to render the window structure and door more aesthetically pleasing. Moreover, by utilizing the two pieces 48, 50 as described and illustrate above, it is possible to efficiently form at area 106 a color scheme where a sharp corner or point of one color paint (e.g., red on surface 56) is formed adjacent to another color paint (e.g., black on surface 58) in a tangential manner. This tangential arrangement of the different color paints is achieved without even having to paint one piece of an applique with different colored paints, because of the partial overlapping of piece 48 with piece 50. This is thought by some to be aesthetically pleasing, and represents an advantage over conventional applique designs.

Once given the above disclosure, many other features, modifications, and improvements will become apparent to the skilled artisan. Such other features, modifications, and improvements are therefore considered to be a part of this invention, the scope of which is to be determined by the following claims.

What is claimed is:

1. A vehicle B-pillar assembly comprising:
   a B-pillar;
   a door structure including first and second pieces of sheet metal which are connected to one another at a flange portion of the door structure;
   a applique including at least first and second partially overlapping pieces for attachment to the door structure;
   wherein a first end portion of said first piece of said applique is at least partially wrapped around said flange portion of the door structure, and at least a portion of a second end of said first piece is located between said door structure and said second piece of said applique; and
   wherein said second piece of said applique includes at least one fastener for helping to retain the applique on said door structure, and wherein said second piece of said applique is positioned relative to said first piece of said applique in a partially overlapping manner so as to help hold said second end of said first piece in position.

2. The pillar assembly of claim 1, wherein said second piece includes a sheet metal member and a polymer inclusive retainer member attached thereto, and wherein said fastener is integrally molded with said polymer inclusive retainer member.

3. The pillar assembly of claim 2, wherein said sheet metal member of said second piece includes an approximately hook shaped portion that at least partially wraps around a portion of said polymer inclusive retainer member.

4. The pillar assembly of claim 1, wherein said first end portion of said first piece comprises an approximately hook shaped retainer member that wraps at least partially around said flange portion of the door structure.

5. The pillar assembly of claim 4, wherein said first piece further comprises an approximately flat or planar portion, wherein said approximately hook shaped retainer member extends from one end of said approximately flat or planar portion and an angled portion extends from another end of said approximately flat or planar portion.

6. The pillar assembly of claim 1, further comprising a recess formed in a portion of said first piece, and wherein a portion of said second piece is received in said recess so as to help hold said first piece in position.

7. The pillar assembly of claim 1, wherein at least a portion of an exterior surface of said first piece is painted a first color and at least a portion of an exterior surface of said second piece is painted a second color that is different than the first color.

8. A method of mounting a multi-piece applique on a vehicle, the method comprising the steps of:
   providing first and second applique pieces;
   mounting the first applique piece on a vehicle structure by at least positioning a retainer portion of the first applique piece at least partially around a flange of a structure of the vehicle;

mounting the second applique piece on the vehicle structure by at least fastening the second applique piece to the vehicle structure using at least one fastener in a manner such that a portion of the second applique piece is located over a portion of the first applique piece in order to help maintain the first applique piece in position on the vehicle whereby the second applique piece partially overlaps the first applique piece on the vehicle.

9. The method of claim 8, further comprising painting at least a portion of an exterior surface of the first piece a first color and painting at least a portion of an exterior surface of the second piece a second color different from the first color, so that the applique appears as a multi-colored applique to a viewer viewing the vehicle on which the applique is mounted.

10. A multi-piece applique for attachment to a door structure or pillar of a vehicle, said multi-piece applique comprising:

a first applique piece including a retainer portion for operative association with the door structure or pillar of the vehicle;

a second applique piece fastened to the door structure or pillar of the vehicle in a manner so as to partially overlap said first applique piece in order to hold said first applique piece in position on the door structure or pillar of the vehicle.

11. The applique of claim 10, wherein at least a portion of an exterior surface of said first piece is painted a first color and at least a portion of an exterior surface of said second piece is painted a second color that is different than the first color.

12. The applique of claim 10, wherein said retainer portion of said first applique piece comprises an approximately hook shaped retainer portion for wrapping around at least a portion of a flange of the door structure or pillar.

13. The applique of claim 12, wherein said first piece further comprises a recess defined therein for receiving a portion of said second piece.

14. The applique of claim 13, wherein said second piece includes a sheet metal member and a polymer inclusive retainer member attached to said sheet metal member, and wherein said polymer inclusive retainer member includes at least one fastener for extending through an aperture in the door structure or pillar in order to help fasten the second piece to said door structure or pillar.

* * * * *